US009868834B2

(12) United States Patent
Groth et al.

(10) Patent No.: US 9,868,834 B2
(45) Date of Patent: Jan. 16, 2018

(54) POLYMER BLEND FOR MEMBRANES

(71) Applicant: EVOQUA WATER TECHNOLOGIES LLC, Warrendale, PA (US)

(72) Inventors: Andrew M. Groth, Castle Hill (AU); Geoffrey Johnston-Hall, Blaxland (AU); Clem Powell, Melbourne (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 14/426,179

(22) PCT Filed: Sep. 12, 2013

(86) PCT No.: PCT/US2013/059399
§ 371 (c)(1),
(2) Date: Mar. 5, 2015

(87) PCT Pub. No.: WO2014/043315
PCT Pub. Date: Mar. 20, 2014

(65) Prior Publication Data
US 2015/0210816 A1     Jul. 30, 2015

(30) Foreign Application Priority Data

Sep. 14, 2012    (AU) .................. 2012904007

(51) Int. Cl.
| | |
|---|---|
| *C08J 9/00* | (2006.01) |
| *B01D 71/34* | (2006.01) |
| *B01D 67/00* | (2006.01) |
| *B01D 69/08* | (2006.01) |

(Continued)

(52) U.S. Cl.
CPC .......... *C08J 9/0061* (2013.01); *B01D 67/0011* (2013.01); *B01D 69/08* (2013.01); *B01D 71/34* (2013.01); *C08L 27/16* (2013.01); *B01D 71/58* (2013.01); *B01D 2323/02* (2013.01);
(Continued)

(58) Field of Classification Search
CPC ............................. C08L 27/14; C08L 2205/03
See application file for complete search history.

(56) References Cited

U.S. PATENT DOCUMENTS

| | | |
|---|---|---|
| 1,994,135 A | 3/1935 | Horowitz |
| 2,658,045 A | 11/1953 | Schildknecht |
| 3,216,983 A | 11/1965 | Levenson |

(Continued)

FOREIGN PATENT DOCUMENTS

| | | |
|---|---|---|
| CA | 897069 A | 4/1972 |
| CA | 2207893 A1 | 12/1997 |

(Continued)

OTHER PUBLICATIONS

Machine translation of KR 2010079630 by Jun et al.*

(Continued)

*Primary Examiner* — Mike M Dollinger
*Assistant Examiner* — Christina Wales (57) ABSTRACT

Disclosed herein are aspects and embodiments of hydrophilic polymeric blend and polymeric membranes which may be formed from the hydrophilic polymeric blend. In one example, the polymeric blend includes a hydrophobic membrane forming polymer and a polyoxazoline as a blend compatible hydrophilizing additive.

5 Claims, 2 Drawing Sheets

Example 1

Example 4

Example 5

(51) Int. Cl.
*C08L 27/16* (2006.01)
*B01D 71/58* (2006.01)

(52) U.S. Cl.
CPC ........ *C08J 2327/16* (2013.01); *C08J 2479/02* (2013.01); *C08L 2205/03* (2013.01)

(56) References Cited

U.S. PATENT DOCUMENTS

| | | |
|---|---|---|
| 3,228,876 A | 1/1966 | Mahon |
| 3,275,554 A | 9/1966 | Wagenaar |
| 3,373,056 A | 3/1968 | Martin |
| 3,435,893 A | 4/1969 | Withers |
| 3,494,780 A | 2/1970 | Skiens |
| 3,556,305 A | 1/1971 | Shorr |
| 3,625,827 A | 12/1971 | Wildi et al. |
| 3,654,147 A | 4/1972 | Levin |
| 3,693,406 A | 9/1972 | Tobin, III |
| 3,708,071 A | 1/1973 | Crowley |
| 3,728,256 A | 4/1973 | Cooper |
| 3,864,289 A | 2/1975 | Rendall |
| 3,876,738 A | 4/1975 | Marinaccio et al. |
| 3,886,066 A | 5/1975 | Chen et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,033,817 A | 7/1977 | Gregor |
| 4,142,526 A | 3/1979 | Zaffaroni et al. |
| 4,188,817 A | 2/1980 | Steigelmann |
| 4,192,750 A | 3/1980 | Elfes et al. |
| 4,193,780 A | 3/1980 | Cotton, Jr. et al. |
| 4,203,848 A | 5/1980 | Grandine, II |
| 4,218,324 A | 8/1980 | Hartmann et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,278,548 A | 7/1981 | Bettinger et al. |
| 4,302,336 A | 11/1981 | Kawaguchi et al. |
| 4,340,479 A | 7/1982 | Pall |
| 4,353,802 A | 10/1982 | Hara et al. |
| 4,354,443 A | 10/1982 | Abrahamson |
| 4,384,474 A | 5/1983 | Kowalski |
| 4,388,189 A | 6/1983 | Kawaguchi et al. |
| 4,407,975 A | 10/1983 | Yamaguchi |
| 4,431,545 A | 2/1984 | Pall et al. |
| 4,439,217 A | 3/1984 | Yamabe et al. |
| 4,451,369 A | 5/1984 | Sekino et al. |
| 4,511,471 A | 4/1985 | Muller |
| 4,519,909 A | 5/1985 | Castro |
| 4,540,490 A | 9/1985 | Shibata et al. |
| 4,547,289 A | 10/1985 | Okano et al. |
| 4,559,139 A | 12/1985 | Uemura et al. |
| 4,609,465 A | 9/1986 | Miller |
| 4,614,109 A | 9/1986 | Hofmann |
| 4,618,533 A | 10/1986 | Steuck |
| 4,623,670 A | 11/1986 | Mutoh et al. |
| 4,623,690 A | 11/1986 | Patzschke et al. |
| 4,629,563 A | 12/1986 | Wrasidlo |
| 4,632,745 A | 12/1986 | Giuffrida et al. |
| 4,636,296 A | 1/1987 | Kunz |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,695,592 A | 9/1987 | Itoh et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,735,261 A | 4/1988 | Huebner |
| 4,737,425 A | 4/1988 | Lin et al. |
| 4,744,240 A | 5/1988 | Reichelt |
| 4,756,875 A | 7/1988 | Tajima et al. |
| 4,758,251 A | 7/1988 | Swedo et al. |
| 4,763,612 A | 8/1988 | Iwanami |
| 4,775,471 A | 10/1988 | Nagai et al. |
| 4,779,448 A | 10/1988 | Gogins |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,812,235 A | 3/1989 | Seleman et al. |
| 4,812,269 A | 3/1989 | Harttig et al. |
| 4,840,227 A | 6/1989 | Schmidt |
| 4,846,970 A | 7/1989 | Bertelsen et al. |
| 4,849,106 A | 7/1989 | Mir |
| 4,855,163 A | 8/1989 | Joffee et al. |
| 4,876,006 A | 10/1989 | Ohkubo et al. |
| 4,883,836 A * | 11/1989 | Thill .................... C08L 69/00 525/146 |
| 4,886,668 A | 12/1989 | Haslam et al. |
| 4,888,115 A | 12/1989 | Marinaccio et al. |
| 4,892,739 A | 1/1990 | Shah et al. |
| 4,904,426 A | 2/1990 | Lundgard et al. |
| 4,909,943 A | 3/1990 | Fibiger et al. |
| 4,931,186 A | 6/1990 | Ford et al. |
| 4,963,304 A | 10/1990 | Im et al. |
| 4,968,733 A | 11/1990 | Muller et al. |
| 4,999,038 A | 3/1991 | Lundberg |
| 5,005,430 A | 4/1991 | Kibler et al. |
| 5,015,275 A | 5/1991 | Beck et al. |
| 5,017,292 A | 5/1991 | DiLeo et al. |
| 5,019,260 A | 5/1991 | Gsell et al. |
| 5,024,762 A | 6/1991 | Ford et al. |
| 5,032,282 A | 7/1991 | Linder et al. |
| 5,043,113 A | 8/1991 | Kafchinski et al. |
| 5,049,275 A | 9/1991 | Gillberg-LaForce et al. |
| 5,066,375 A | 11/1991 | Parsi et al. |
| 5,066,402 A | 11/1991 | Anselme et al. |
| 5,069,065 A | 12/1991 | Sprunt et al. |
| 5,075,065 A | 12/1991 | Effenberger et al. |
| 5,079,272 A | 1/1992 | Allegrezza, Jr. et al. |
| 5,094,750 A | 3/1992 | Kopp et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,137,633 A | 8/1992 | Wang |
| 5,138,870 A | 8/1992 | Lyssy |
| 5,147,553 A | 9/1992 | Waite |
| 5,151,189 A | 9/1992 | Hu et al. |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,182,019 A | 1/1993 | Cote et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,275,766 A | 1/1994 | Gadkaree et al. |
| 5,277,812 A | 1/1994 | Hu et al. |
| 5,282,971 A | 2/1994 | Degen et al. |
| 5,286,324 A | 2/1994 | Kawai et al. |
| 5,288,324 A | 2/1994 | Shaneyfelt |
| 5,297,420 A | 3/1994 | Gilliland et al. |
| 5,320,760 A | 6/1994 | Freund et al. |
| 5,353,630 A | 10/1994 | Soda et al. |
| 5,354,587 A | 10/1994 | Abayasekara |
| 5,361,625 A | 11/1994 | Ylvisaker |
| 5,364,527 A | 11/1994 | Zimmermann et al. |
| 5,376,274 A | 12/1994 | Muller et al. |
| 5,389,260 A | 2/1995 | Hemp et al. |
| 5,396,019 A | 3/1995 | Sartori et al. |

(56) References Cited

U.S. PATENT DOCUMENTS

| | | |
|---|---|---|
| 5,401,401 A | 3/1995 | Hickok et al. |
| 5,403,479 A | 4/1995 | Smith et al. |
| 5,403,483 A | 4/1995 | Hayashida et al. |
| 5,411,663 A | 5/1995 | Johnson |
| 5,417,101 A | 5/1995 | Weich |
| 5,419,816 A | 5/1995 | Sampson et al. |
| 5,451,317 A | 9/1995 | Ishida et al. |
| 5,470,469 A | 11/1995 | Eckman |
| 5,477,731 A | 12/1995 | Mouton |
| 5,480,553 A | 1/1996 | Yamamori et al. |
| 5,525,220 A | 6/1996 | Yagi et al. |
| 5,531,900 A | 7/1996 | Raghavan et al. |
| 5,543,465 A | 8/1996 | Bell et al. |
| 5,547,575 A | 8/1996 | Demmer et al. |
| 5,607,593 A | 3/1997 | Cote et al. |
| 5,639,373 A | 6/1997 | Mahendran et al. |
| 5,647,988 A | 7/1997 | Kawanishi et al. |
| 5,725,769 A | 3/1998 | Miller et al. |
| 5,747,605 A | 5/1998 | Breant et al. |
| D396,046 S | 7/1998 | Scheel et al. |
| D396,477 S | 7/1998 | Sadr |
| 5,783,083 A | 7/1998 | Henshaw et al. |
| D400,890 S | 11/1998 | Gambardella |
| 5,871,823 A | 2/1999 | Anders et al. |
| 5,906,742 A | 5/1999 | Wang et al. |
| 5,918,264 A | 6/1999 | Drummond et al. |
| 5,942,113 A | 8/1999 | Morimura |
| 5,944,997 A | 8/1999 | Pedersen et al. |
| 5,958,243 A | 9/1999 | Lawrence et al. |
| 5,981,614 A | 11/1999 | Adiletta |
| 5,988,400 A | 11/1999 | Karachevtcev et al. |
| 6,045,698 A | 4/2000 | Cote et al. |
| 6,045,899 A | 4/2000 | Wang et al. |
| 6,048,454 A | 4/2000 | Jenkins |
| 6,056,903 A | 5/2000 | Greenwood et al. |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,794 A | 9/2000 | Kumar et al. |
| 6,156,200 A | 12/2000 | Zha et al. |
| 6,159,369 A | 12/2000 | Strohm et al. |
| 6,193,890 B1 | 2/2001 | Pedersen et al. |
| 6,214,231 B1 | 4/2001 | Cote et al. |
| 6,221,247 B1 | 4/2001 | Nemser et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,299,773 B1 | 10/2001 | Takamura et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran et al. |
| 6,423,784 B1 | 7/2002 | Hamrock et al. |
| 6,440,303 B2 | 8/2002 | Spriegel |
| D462,699 S | 9/2002 | Johnson et al. |
| 6,448,062 B1 | 9/2002 | Huth et al. |
| 6,465,748 B2 | 10/2002 | Yamanashi et al. |
| 6,491,165 B2 | 12/2002 | Kuske et al. |
| 6,495,041 B2 | 12/2002 | Taniguchi et al. |
| 6,550,747 B2 | 4/2003 | Rabie et al. |
| 6,565,748 B1 | 5/2003 | Wang et al. |
| 6,582,603 B1 | 6/2003 | Suzuki et al. |
| 6,596,167 B2 | 7/2003 | Ji et al. |
| D478,913 S | 8/2003 | Johnson et al. |
| 6,602,391 B2 | 8/2003 | Serikov |
| 6,635,104 B2 | 10/2003 | Komkova et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,685,832 B2 | 2/2004 | Mahendran et al. |
| 6,699,611 B2 | 3/2004 | Kim et al. |
| 6,705,465 B2 | 3/2004 | Ling et al. |
| 6,721,529 B2 | 4/2004 | Chen et al. |
| 6,723,246 B2 | 4/2004 | Krulik |
| 6,723,758 B2 | 4/2004 | Stone et al. |
| 6,727,305 B1 | 4/2004 | Pavez Aranguiz |
| 6,761,013 B2 | 7/2004 | Tippey et al. |
| 6,770,202 B1 | 8/2004 | Kidd et al. |
| 6,783,008 B2 | 8/2004 | Zha et al. |
| 6,790,912 B2 | 9/2004 | Blong |
| 6,793,820 B1 | 9/2004 | McCray et al. |
| 6,811,696 B2 | 11/2004 | Wang et al. |
| 6,821,420 B2 | 11/2004 | Zha et al. |
| 6,830,782 B2 | 12/2004 | Kanazawa |
| 6,851,259 B2 | 2/2005 | Simburger et al. |
| 6,861,466 B2 | 3/2005 | Dadalas et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,974,554 B2 | 12/2005 | Cox et al. |
| 6,994,867 B1 | 2/2006 | Hossainy et al. |
| 7,000,764 B2 | 2/2006 | Otsubo |
| 7,041,728 B2 | 5/2006 | Zipplies et al. |
| 7,067,058 B2 | 6/2006 | Yeh et al. |
| 7,070,909 B2 | 7/2006 | Japp et al. |
| 7,226,541 B2 | 6/2007 | Muller et al. |
| 7,229,712 B2 | 6/2007 | Eshraghi et al. |
| 7,247,238 B2 | 7/2007 | Mullette et al. |
| 7,390,418 B2 | 6/2008 | Martin et al. |
| 7,395,646 B2 | 7/2008 | Salman et al. |
| 7,449,112 B2 | 11/2008 | Lee et al. |
| 7,459,085 B2 | 12/2008 | Koguma et al. |
| 7,537,718 B2 | 5/2009 | Mezhirov et al. |
| 7,632,439 B2 | 12/2009 | Mullette et al. |
| 7,648,034 B2 | 1/2010 | Charkoudian et al. |
| 7,662,212 B2 | 2/2010 | Mullette et al. |
| 7,819,956 B2 | 10/2010 | Muller |
| 7,867,417 B2 | 1/2011 | Mullette |
| 2002/0104439 A1 | 8/2002 | Komkova et al. |
| 2002/0148767 A1 | 10/2002 | Johnson et al. |
| 2003/0065302 A1 | 4/2003 | Kuroda et al. |
| 2003/0073970 A1 | 4/2003 | Suga |
| 2003/0077435 A1 | 4/2003 | Charkoudian et al. |
| 2003/0226797 A1 | 12/2003 | Phelps |
| 2004/0092901 A1 | 5/2004 | Reece et al. |
| 2004/0167490 A1 | 8/2004 | Nelson et al. |
| 2004/0167493 A1 | 8/2004 | Jarpenberg et al. |
| 2004/0168947 A1 | 9/2004 | McDonald |
| 2004/0172002 A1 | 9/2004 | Nelson et al. |
| 2004/0176735 A1 | 9/2004 | Snell |
| 2004/0195172 A1 | 10/2004 | Yeh et al. |
| 2005/0015052 A1 | 1/2005 | Klippen et al. |
| 2005/0035065 A1 | 2/2005 | Martin |
| 2005/0090419 A1 | 4/2005 | Delcomyn et al. |
| 2005/0098494 A1 | 5/2005 | Mullette et al. |
| 2005/0184008 A1 | 8/2005 | Schacht et al. |
| 2005/0218069 A1 | 10/2005 | Lee et al. |
| 2006/0157404 A1 | 7/2006 | Mullette et al. |
| 2006/0178480 A1 | 8/2006 | Tada et al. |
| 2006/0228483 A1 | 10/2006 | Abidine |
| 2006/0237038 A1 | 10/2006 | Jetten et al. |
| 2007/0007197 A1 | 1/2007 | Mahendran et al. |
| 2007/0107884 A1 | 5/2007 | Sirkar et al. |
| 2008/0058440 A1 | 3/2008 | Muller et al. |
| 2008/0203018 A1 | 8/2008 | Muller et al. |
| 2008/0214687 A1 | 9/2008 | Muller et al. |
| 2010/0000942 A1 | 1/2010 | Muller et al. |
| 2010/0119815 A1 | 5/2010 | Kim |
| 2010/0213117 A1 | 8/2010 | Mullette et al. |
| 2011/0147308 A1 | 6/2011 | Johnston-Hall et al. |
| 2011/0244215 A1* | 10/2011 | Thom ............... B01D 67/0093 428/304.4 |
| 2013/0284245 A1* | 10/2013 | Kim ..................... C08J 7/045 136/252 |

(56) References Cited

U.S. PATENT DOCUMENTS

| | | | | |
|---|---|---|---|---|
| 2014/0144833 A1* | 5/2014 | Kosar | ................ | B01D 67/0011 210/500.23 |

FOREIGN PATENT DOCUMENTS

| | | | | |
|---|---|---|---|---|
| CA | 2428457 | A1 | 5/2002 | |
| CA | 2440961 | A1 | 9/2002 | |
| CN | 1159770 | A | 9/1997 | |
| CN | 1552507 | A | 12/2004 | |
| DE | 3904544 | A1 | 8/1990 | |
| DE | 4007383 | A1 | 9/1991 | |
| DE | 4117281 | A1 | 1/1992 | |
| DE | 4113420 | A1 | 10/1992 | |
| DE | 4117422 | C1 | 11/1992 | |
| DE | 19503060 | A1 | 8/1996 | |
| DE | 29906389 | U1 | 6/1999 | |
| EP | 250337 | A1 | 12/1987 | |
| EP | 261734 | A1 | 3/1988 | |
| EP | 0341151 | A2 | 11/1989 | |
| EP | 0385747 | A2 * | 9/1990 | ......... C08G 73/0233 |
| EP | 419396 | A1 | 3/1991 | |
| EP | 229019 | B1 | 9/1991 | |
| EP | 0474512 | A2 * | 3/1992 | .............. C08L 27/08 |
| EP | 492942 | A2 | 7/1992 | |
| EP | 509663 | B2 | 10/1992 | |
| EP | 550798 | A1 | 7/1993 | |
| EP | 492446 | B1 | 11/1995 | |
| EP | 430082 | B1 | 6/1996 | |
| EP | 581168 | B1 | 10/1996 | |
| EP | 763758 | A1 | 3/1997 | |
| EP | 0772488 | A1 | 5/1997 | |
| EP | 911073 | A1 | 4/1999 | |
| EP | 920904 | A2 | 6/1999 | |
| EP | 1034835 | A1 | 9/2000 | |
| EP | 1236503 | B1 | 8/2004 | |
| FR | 2620712 | A1 | 3/1989 | |
| FR | 2674448 | A1 | 10/1992 | |
| FR | 2850297 | A1 | 7/2004 | |
| GB | 702911 | A | 1/1954 | |
| GB | 1238004 | * | 7/1971 | |
| GB | 1238004 | A | 7/1971 | |
| GB | 2253572 | A | 9/1992 | |
| GB | 2390042 | A | 12/2003 | |
| JP | 53-028083 | | 3/1978 | |
| JP | 55129155 | A | 10/1980 | |
| JP | 58088007 | A | 5/1983 | |
| JP | 60260628 | A | 12/1985 | |
| JP | 61097006 | A | 5/1986 | |
| JP | 61107905 | A | 5/1986 | |
| JP | 61192309 | A | 8/1986 | |
| JP | 61257203 | A | 11/1986 | |
| JP | 61263605 | A | 11/1986 | |
| JP | 62004408 | A | 1/1987 | |
| JP | 62068828 | A | 3/1987 | |
| JP | 62114609 | A | 5/1987 | |
| JP | 62140607 | A | 6/1987 | |
| JP | 62179540 | A | 8/1987 | |
| JP | 62250908 | A | 10/1987 | |
| JP | 63097634 | A | 4/1988 | |
| JP | 64-075542 | A | 3/1989 | |
| JP | 01-307409 | A | 12/1989 | |
| JP | 2009498 | A | 1/1990 | |
| JP | 02031200 | A | 2/1990 | |
| JP | 02-086822 | A | 3/1990 | |
| JP | 02144132 | A | 6/1990 | |
| JP | 02164423 | A | 6/1990 | |
| JP | 02284035 | A | 11/1990 | |
| JP | 02302449 | A | 12/1990 | |
| JP | 03018373 | A | 1/1991 | |
| JP | 03110445 | A | 5/1991 | |
| JP | 03-137927 | A | 6/1991 | |
| JP | 03186325 | A | 8/1991 | |
| JP | 04022428 | | 1/1992 | |
| JP | 04187224 | A | 7/1992 | |
| JP | 04250898 | A | 9/1992 | |
| JP | 04265128 | A | 9/1992 | |
| JP | 04293528 | A | 10/1992 | |
| JP | 04300636 | A | 10/1992 | |
| JP | 04310223 | A | 11/1992 | |
| JP | 05023557 | A | 2/1993 | |
| JP | 05-96140 | | 4/1993 | |
| JP | 05096136 | A | 4/1993 | |
| JP | 05115760 | A | 5/1993 | |
| JP | 05131124 | A | 5/1993 | |
| JP | 05157654 | A | 6/1993 | |
| JP | 05285348 | A | 11/1993 | |
| JP | 06-027215 | A | 2/1994 | |
| JP | 06-087935 | A | 3/1994 | |
| JP | 06071120 | A | 3/1994 | |
| JP | 06114240 | A | 4/1994 | |
| JP | 06218237 | A | 8/1994 | |
| JP | 06285496 | A | 10/1994 | |
| JP | 06343837 | A | 12/1994 | |
| JP | 07000770 | A | 1/1995 | |
| JP | 07003043 | A | 1/1995 | |
| JP | 07024272 | A | 1/1995 | |
| JP | 07155570 | A | 6/1995 | |
| JP | 07155758 | A | 6/1995 | |
| JP | 07185268 | A | 7/1995 | |
| JP | 07185271 | A | 7/1995 | |
| JP | 07275665 | A | 10/1995 | |
| JP | 08010585 | A | 1/1996 | |
| JP | 08052331 | A | 2/1996 | |
| JP | 09141063 | A | 6/1997 | |
| JP | 09220569 | A | 8/1997 | |
| JP | 09324067 | A | 12/1997 | |
| JP | 09512857 | | 12/1997 | |
| JP | 10-060142 | A | 3/1998 | |
| JP | 10156149 | A | 6/1998 | |
| JP | 11152366 | A | 6/1999 | |
| JP | 11165200 | A | 6/1999 | |
| JP | 11302438 | A | 11/1999 | |
| JP | 2000342932 | A | 12/2000 | |
| JP | 2004230280 | A | 8/2004 | |
| JP | 2004523338 | T | 8/2004 | |
| JP | 2005-514517 | T | 5/2005 | |
| JP | 2005154551 | A | 6/2005 | |
| JP | 2005-528213 | A | 9/2005 | |
| JP | 2005-537120 | T | 12/2005 | |
| JP | 2006517469 | T | 7/2006 | |
| KR | 2002061017 | | 7/2002 | |
| WO | 8806200 | A1 | 8/1988 | |
| WO | 9000434 | A1 | 1/1990 | |
| WO | 9117204 | A1 | 11/1991 | |
| WO | 9302779 | A1 | 2/1993 | |
| WO | 9315827 | A1 | 8/1993 | |
| WO | 9534424 | A1 | 12/1995 | |
| WO | 9603202 | A1 | 2/1996 | |
| WO | 9607470 | A1 | 3/1996 | |
| WO | 1996014913 | A1 | 5/1996 | |
| WO | 9641676 | A1 | 12/1996 | |
| WO | 9822204 | A1 | 5/1998 | |
| WO | 9825694 | A1 | 6/1998 | |
| WO | 9828066 | A1 | 7/1998 | |
| WO | 9901207 | A1 | 1/1999 | |
| WO | 2000043115 | A1 | 7/2000 | |
| WO | 2002038256 | A1 | 5/2002 | |
| WO | 2002087734 | A1 | 11/2002 | |
| WO | 2003068374 | A1 | 8/2003 | |
| WO | 2003080228 | A1 | 10/2003 | |
| WO | 2003095078 | A1 | 11/2003 | |
| WO | 2004078327 | A1 | 9/2004 | |
| WO | 2004094049 | A1 | 11/2004 | |
| WO | 2005002712 | A1 | 1/2005 | |
| WO | 2005005028 | A1 | 1/2005 | |
| WO | 2005030916 | A2 | 4/2005 | |
| WO | 2006002479 | A1 | 1/2006 | |
| WO | 2006058384 | A1 | 6/2006 | |
| WO | 2007006104 | A1 | 1/2007 | |

(56) References Cited

FOREIGN PATENT DOCUMENTS

| WO | 2007035987 A1 | 4/2007 | |
|---|---|---|---|
| WO | WO 2012091309 A2 * | 7/2012 | ............... C08F 34/02 |

OTHER PUBLICATIONS

Chiu, T.T.; Thill, B.P.; Fairchok, W.J. "Poly(2-ethyl-2-oxazoline): A New Water and Organic-Soluble Adhesive" Glass,; Water-Soluble Polymers. 1986. American Chemical Society.*
Almulla et al., "Developments in high recovery brackish water desalination plants as part of the solution to water quantity problems," Desalination, 153 (2002), pp. 237-243.
Anonymous, "Nonwoven Constructions of Dyneon" THV and Dyneon "The Fluorothermoplastics", Research Disclosure Journal, Apr. 1999, RD 420013, 2 pages.
Bao, Zhu, Chen, Xu and Xu, Progresses of Hydrophilic Modification and Functionalization of Poly(vinylidene fluoride) Porous Membranes, Journal of Functional Polymers, vol. 16, No. 2, pp. 269-270, Jun. 2003, Institute of Polymer Science, Zhejiang University.
Bhardwaj et al., Polysulfone Hollow Fibre Gas Separation Membranes filled with submicron particles; Annals of the New York Academy of Sciences; Mar. 2003, vol. 984, Advanced Membrane Technology, pp. 318-328.
Bhattacharyya et al., "Development and Characterization of PVDF-PAA Pore-Filled pH-Sensitive Membranes" in Responsive Membranes and Materials; John Wiley & Sons Ltd., United Kingdom, 2013, pp. 190-199.
Dupont Oxone Monopersulfate Compound, product literature (2008) pp. 1-3. http://ww2.dupont.com/Oxone/en_US/assets/downloads/K20101%20Oxone%20General%20Info.pdf.
Ebewele et al., "Polymer Science and Technology," p. 445.
Hall, R. (1982) Peroxides and Peroxy Compounds, Inorganic, in Kirk-Othmer Encyclopedia of Chemical Technology, vol. 17, 3rd edition, John Wiley & Sons, p. 14-16.
Holleman-Wiberg, Inorganic Chemistry, Academic Press (2001), p. 449.
Hougham et al, "Fluoropolymers: Synthesis," p. 92.
Hu et al., "Development and characterization of poly(vinylidene fluoride)-poly(acrylic acid) pore-filled pH-sensitive membranes," Journal of Membrane Science, 2007, vol. 301, pp. 19-28.
Hu et al., "In vitro investigation of potential application of pH-sensitive poly(vinylidene fluoride)-poly(acrylic acid) pore-filled membranes for controlled drug release in ruminant animals," Journal of Membrane Science, 2009, vol. 337, pp. 9-16.
International Preliminary Report on Patentability dated Mar. 26, 2015 for International Application No. PCT/US2013/059399.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.
Kolthoff, I.M., et al., "The Chemistry of Persulfate—The Kinetics and Mechanism of the Decomposition of the Persulfate Ion in Aqueous Medium", Journal of the American Chemical Society, Jul. 1951, vol. 73, pp. 3055-3059.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, (2002) vol. 151, pp. 195-200.
Smolders et al., "Liquid-liquid phase separation in concentrated solutions of non-crystallizable polymers by spinodal decomposition," Kolloid-Z. u. Polymere, 243, 14-20 (1971).
Ueda et al., "Effects of Aeration on Suction Pressure in a Submerged Membrane Bioreactor," Wat. Res. vol. 31, No. 3, 1997, pp. 489-494.
US EPA, Organophosphorous cumulative risk assessment—2006 Update, Aug. 2006, pp. 1-30, 72-89.
Wharry, JR., "Fluropolymer Heat Exchangers," Metal Finishing vol. 99, Supplement 1, Jan. 2001, pp. 760-777.
White et al., The Chemical Engineering Journal, 52 (1993), pp. 73-77.
Zaheed et al., "Review of polymer compact heat exchangers, with special emphasis on a polymer film unit," Journal of Applied Thermal Engineering, 2004, vol. 24, pp. 2323-2358.
Zeman et al., "Microfiltration and Ultrafiltration Principles and Practice," (1996) ISBN 0-8247-9735-3, pp. 144-145 and 167.
Zenon, "Proposal for ZeeWeed® Membrane Filtration Equipment System for the City of Westminster, Colorado, Proposal No. 479-99," Mar. 2000, entire publication.

* cited by examiner

TABLE 1. PVDF/PEOAz Blend Membrane Dopes

| Example | Formulation (given as weight percent) | | | | | | | Fibre Properties | | | |
|---|---|---|---|---|---|---|---|---|---|---|---|
| | NMP (%) | SOLEF 1015 (%) | PEOAz 50 (%) | PEOAz 200 (%) | PVP-VA W735 (%) | Glycerol (%) | | PERM$_{CW2}$ (LMH) | Bubble Point in Water (kPa) | Elongation at Break (%) | Break Stress (MPa) |
| 1 | Balance | 20 | | | | 3 | | 37 | 300 | 131 | 6.5 |
| 2 | Balance | 20 | 10 | | | | | 160 | 1300 | 392 | 3.6 |
| 3 | Balance | 20 | | 4 | | 3 | | 70 | 600 | 206 | 6.9 |
| 4 | Balance | 20 | | 8 | | 3 | | 254 | 380 | 185 | 5.1 |
| 5 | Balance | 20 | | 12 | | 3 | | 1559 | 300 | 147 | 4.6 |
| 6 | Balance | 15 | | | 5.2 | 3 | | 528 | 500 | 190 | 4.5 |
| 7 | Balance | 14 | 0.5 | | 5.2 | 3 | | 1190 | 360 | 219 | 3.2 |

POLYMER BLEND FOR MEMBRANES

RELATED APPLICATIONS

The present application claims priority to Australian provisional application number 2012904007 titled A POLYMER BLEND FOR MEMBRANES, filed on Sep. 14, 2012.

BACKGROUND

1. Technical Field

Aspects and embodiments disclosed herein relate to blended polymers, their use as porous polymeric filtration membranes and to methods of preparation thereof.

2. Discussion of Related Art

Membrane filtration devices may be used to separate contaminants, for example, particles, solids, and/or microorganisms from fluids, for example, water. In membrane filtration devices, fluid is driven through a membrane, while contaminants are excluded from passing through the membrane on the basis of size, due to adsorption onto surfaces of the membrane, or due to electrostatic repulsion from surfaces of the membrane. The driving force for moving fluid through the membrane is typically fluid pressure. Pores in the membrane may exclude particles having sizes greater than the pores from passing through the membrane wall.

A barrier is typically formed between an incoming liquid stream to be filtered, typically referred to as feed, and the filtered liquid stream, typically referred to as filtrate, by sealing the ends of a filtration membrane, for example, a porous hollow membrane, in a module pot. To accomplish effective filtration it is typically desirable that the integrity of the barrier is maintained. Any compromise of the barrier integrity may result in undesirable contamination of the filtrate stream.

The membranes in a membrane filtration system may be formed of various materials, for example, ceramics or polymers.

SUMMARY

According to one aspect, there is provided a hydrophilic polymeric blend comprising a compatible mixture of a membrane forming polymer and polyoxazoline.

In some embodiments, the membrane forming polymer is a hydrophobic polymer. The membrane forming polymer may comprise polyvinylidene fluoride (PVDF). The polyoxazoline may comprise polyethyloxazoline (PEOAz). The polyoxazoline may have a molecular weight of from about 5,000 g/mol to about 500,000 g/mol.

In some embodiments, the ratio of the membrane forming polymer to the to polyoxazoline is from about 2:1 by weight to about 50:1 by weight, from about 3:1 by weight to about 28:1 by weight, or from about 3:1 by weight to about 4:1 by weight.

According to another aspect, there is provided a hydrophilic porous polymeric membrane comprising a compatible mixture of a membrane forming polymer and polyoxazoline.

In some embodiments, the membrane forming polymer is a hydrophobic polymer. The membrane forming polymer may comprise PVDF. The polyoxazoline may comprise PEOAz. The polyoxazoline may have a molecular weight of from about 5,000 g/mol to about 500,000 g/mol.

In some embodiments, the ratio of the membrane forming polymer to the polyoxazoline is from about 2:1 by weight to about 50:1 by weight, from about 3:1 by weight to about 28:1 by weight, or from about 3:1 by weight to about 4:1 by weight.

In some embodiments, the hydrophilic porous polymeric membrane further comprises a pore forming agent. The pore forming agent may be polyvinylpyrrolidone-co-vinyl acetate (PVP-VA).

According to another aspect, there is provided a membrane forming dope. The membrane forming dope comprises a membrane forming solvent and a dissolved polymeric blend including a compatible mixture of a membrane forming polymer and polyoxazoline.

In some embodiments, the membrane forming dope further comprises a pore forming agent. The membrane forming dope may further comprise one of polyvinylpyrrolidone-co-vinyl acetate (PVP-VA) and water.

In some embodiments, the membrane forming solvent is selected from the group consisting of N-methylpyrrolidone (NMP), dimethyl acetaminde (DMA), dimethylformamide (DMF), dimethyl sulfoxide (DMSO), triethyl phosphate (TEP), and butyrolactone. The membrane forming solvent may be NMP. The membrane forming solvent may be present in the membrane forming dope in an amount of from about 60 wt % to about 80 wt %.

In some embodiments, the polymeric blend is present in the membrane forming dope in an amount of from about 1 wt % to about 25 wt % or from about 14 wt % to about 20 wt %.

According to another aspect, there is provided a method of increasing the hydrophilicity of a porous polymeric membrane. The method comprises incorporating polyethyloxazoline into a membrane forming dope prior to forming the porous polymeric membrane from the membrane forming dope.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects and embodiments of filtration membranes and of methods of forming same disclosed herein overcome or ameliorate disadvantages of the prior art and provide useful alternatives.

The aspects and embodiments disclosed herein are not limited in application to the details of construction and the arrangement of components set forth in the following description or illustrated in the drawings. The disclosed aspects and embodiments are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Synthetic polymeric membranes may be utilized in the field of filtration, for example, ultrafiltration and/or microfiltration, for a variety of purposes including, but not limited to, desalination, gas separation, water or wastewater purification, dialysis, to and the separation of particles from fluids in municipal drinking water and in the food, pharmaceutical, metalworking, dairy, and wine industries. The properties of the membranes vary depending on the morphology of the membranes, for example, depending on properties such as symmetry, pore shape, pore size, and the chemical nature of the polymeric material used to form the membrane. For example, microporous phase inversion membranes and membranes having high surface charges are particularly well suited for the removal of viruses and bacteria from a fluid medium as disclosed in co-pending U.S. patent application Ser. No. 12/973,508, titled CHARGED POROUS POLYMERIC MEMBRANES AND THEIR PREPARATION, filed Dec. 20, 2010, which is incorporated herein by reference.

Different membranes can be used for specific separation processes, including microfiltration, ultrafiltration, and reverse osmosis. Microfiltration, ultrafiltration, and reverse osmosis are pressure driven filtration processes which are distinguished by the size of the particles or molecules that a membrane is capable of retaining or passing. Microfiltration can remove very fine colloidal particles in the micrometer and sub-micrometer range. As a general rule, microfiltration can filter particles down to 0.05 µm, whereas ultrafiltration can retain particles as small as 0.01 µm and smaller. Reverse osmosis systems are typically capable of removing even smaller particles from a liquid.

A large filtration membrane surface area may facilitate the production of a large flux of filtrate from a fluid to be filtered. A compact filtration apparatus may include membranes formed in the shape of hollow porous fibers. Hollow fiber membranes offer the combined benefits of high surface area, high achievable membrane packing densities, sanitary design, and good structural integrity. As a result, systems utilizing hollow fiber filtration membranes may be capable of providing for a greater rate of fluid filtration while using less space and lower power consumption as compared to systems utilizing other forms of filtration membranes. Hollow fiber membranes are thus highly practical and cost effective alternatives to other membrane configurations which may be used in separation processes such as flat sheet or spiral wound membranes.

A large number of hollow fiber filtration membranes (for example, up to several thousand) may be bundled together and housed in a filtration module. The hollow fiber filtration membrane module configuration is a highly desirable one as it enables the modules to achieve a very high filtration membrane surface area per unit volume. The hollow fiber filtration membranes may act in parallel to filter a fluid, for example, water, for purification. In "outside-in" filtration, fluid to be filtered may flow in contact with the outer surface of all the hollow fiber filtration membranes in the module. By applying pressure across the walls of the hollow fiber filtration membranes (a transmembrane pressure), the fluid is forced into the central channel, or lumen, of each of the hollow fiber filtration membranes while microcontaminants remain trapped outside the hollow fiber filtration membranes. The filtered fluid, or filtrate, may collect inside the hollow fiber filtration membranes and be drawn off through ends of the lumens. In "inside-out" filtration, fluid to be filtered may flow in contact with the lumens of the membranes. The fluid may be forced through the walls of the membranes by the application of a transmembrane pressure and filtrate may be collected from the external sides of the membranes.

To facilitate their use as hollow fiber filtration membranes polymeric fibers may be formed with a microstructure which provides for microfiltration to readily be performed. In some embodiments, it has been found beneficial for the microstructure of ultrafiltration and microfiltration membranes to be asymmetric. For example, in some embodiments, the pore size gradient across the membrane is not homogeneous, but rather varies in relation to the cross-sectional distance within the membrane. In some embodiments, it has been found beneficial to provide hollow fiber filtration membranes as asymmetric membranes possessing tightly bunched small pores on outer surfaces and larger more open pores towards the inside edge of the membrane walls. This microstructure has been found to be advantageous as it provides a good balance between mechanical strength and filtration efficiency.

The chemical properties of hollow fiber membranes are also important factors in determining the utility and effectiveness of the hollow fiber membranes for use in fluid filtration. The hydrophilic or hydrophobic nature of a hollow fiber membrane is one important chemical property.

Many of the polymers traditionally used to cast porous filtration membranes are hydrophobic polymers. Water can be forced through a hydrophobic porous membrane by use of sufficient pressure, but the pressure needed may in some instances be very high, for example, between about 150 psi (1 MPa) and 300 psi (2 MPa). A membrane may be damaged at such pressures and generally does not become wetted evenly.

It has been observed that hydrophilic membranes generally suffer less adsorptive fouling than hydrophobic membranes. Hydrophobic membranes, however, usually offer better chemical, thermal, and biological stability than hydrophilic membranes. In the field of water filtration membranes, it may in some instances be desirable to combine the low-fouling properties of hydrophilic polymeric membranes with the stability of hydrophobic polymeric membranes.

Hollow fiber microfiltration and/or ultrafiltration membranes may be prepared from polymers including, for example, polyolefins, polyvinylidene fluoride (PVDF), polyethersulfone (PES), polysulfone (PSf), polyacrylonitrile (PAN), ethylene-chlorotrifluoroethylene copolymer, ethylene-chlorotrifluoroethylene terpolymer with n-butyl acrylate, terpolymers of vinyl fluoride/chloride, vinylidene fluoride/chloride, hexafluoropropylene, chlorotrifluoroethlyene, and tetrafluoroethylene. These materials provide desirable structural characteristics and mechanical strength to a filtration membrane formed therefrom, however, a drawback of some of these materials is that they are both hydrophobic and undergo fouling readily during use as filtration membranes. Furthermore, in some demanding applications, mechanical properties such as the break strength and extension of these materials are less than optimal.

One method to improve the fouling performance and mechanical properties of hollow fiber membranes formed of a hydrophobic material is to incorporate a hydrophilic polymer into the fiber membrane formulation that is able to impart mechanical and chemical properties to a resulting membrane which are superior to a membrane formed of the hydrophobic material alone. The term "hydrophilic" is relative and as used herein refers to compound which when added to a base membrane forming polymer renders a membrane formed of the resultant mixture more to hydrophilic than if the membrane did not contain that compound.

Examples of hydrophilic polymers which may be incorporated into a hydrophobic membrane forming material to improve the chemical and/or mechanical properties of the hydrophobic membrane forming material include, but are not limited to poly(vinylpyrrolidone) (PVP) and PVP copolymers, such as poly(vinylpyrrolidone/vinylacetate) copolymer, poly(vinylpyrrolidone/acrylic acid) copolymer, poly(vinylpyrrolidone/alkylaminomethacrylate) copolymer, poly(vinylpyrrolidone/alkylaminomethacrylamide) copolymer, poly(vinylpyrrolidone/methacrylamidopropyl trimethylammonium chloride) copolymer, polyethylene glycol, polypropylene glycol, polyelectrolyte, polyvinyl alcohol, polyacrylic acid, cellulose acetate, sulfonated polymers or mixtures of any of these types of polymers.

Many polymers are incompatible with one another and will not easily mix or will easily separate if mixed. Membranes formed from a mix of incompatible polymers often display poor mechanical properties. A compatible polymer blend or mixture can be defined as one in which the constituent polymers are miscible do not phase separate in a membrane forming solvent, for example, N-methylpyrrolidone (NMP), dimethyl acetaminde (DMA), dimethylformamide (DMF), dimethyl sulfoxide (DMSO), triethyl phosphate (TEP), or butyrolactone. To form membranes having desirable mechanical and chemical properties from a mixture of polymers, it is often important that the polymers not only be compatible in a dissolved state (a dope solution), but also that they behave in a compatible manner during a phase separation stage to ensure uniform or at least predictable incorporation in the polymeric membrane. The identification of polymer additives which are both compatible with a hydrophobic membrane forming polymer and which are capable of improving the hydrophilicity and/or mechanical properties of the resulting membrane is thus of great interest.

Aspects and embodiments disclosed herein are described with respect to polymeric ultrafiltration membranes or microfiltration membranes. However, it will be appreciated by those skilled in the art that the aspects and embodiments disclosed herein may be applied to any appropriate polymeric material where modifications of to the kind described are desirable.

It has been discovered that polyoxazoline may form a compatible mixture with many known hydrophobic membrane forming polymer materials. Incorporating polyoxazoline into a hydrophobic membrane forming polymer may provide chemical and/or mechanical properties to a membrane formed from the hydrophobic membrane forming polymer doped with the polyoxazoline which are superior to those of membranes formed form the hydrophobic membrane forming polymer alone. For example, a membrane formed from a hydrophobic membrane forming polymer doped with polyoxazoline may exhibit greater hydrophilicity, greater achievable elongation prior to break, a greater break stress, a greater fluid permeability, and/or a greater bubble point than membranes formed form the hydrophobic membrane forming polymer alone. Further, polyoxazoline exhibits properties which are superior to many hydrophilizing agents which have previously been used in combination with hydrophobic polymers in the formation of filtration membranes. For example, it has been found that polyoxazoline has better thermal stability than some previously known hydrophilizing agents, for example, polyvinylalcohol. Polyoxazoline has been found to exhibit greater solubility in PVDF than polyethylene glycol and may provide for greater hydrophilicity in a PVDF blend membrane than polyethylene glycol. Polyoxazoline may be incorporated into PVDF blend membranes at high concentrations while providing for the membranes to exhibit favorable properties, for example, properties related to flow and to microstructure and pore size control.

In some embodiments, the polyoxazoline is a polyalkyloxazoline having the following general formula:

The alkyl group may be methyl, ethyl, propyl, or butyl, or any other suitable group. In some embodiments, the alkyl group is ethyl, and the additive is polyethyloxazoline (PEOAz):

In various embodiments, the value of n may be any desired value, for example, from about 50 to about 5,000, giving polymer molecular weights of between about 5,000 g/mol and about 500,000 g/mol for the polyoxazoline. A suitable commercially available polyethyloxazoline is Aquazol® poly (2-ethyl-2-oxazoline) (Polymer Chemistry Innovations, Inc.), which is available in molecular weights of 5,000 g/mol, 50,000 g/mol, 200,000 g/mol, and 500,000 g/mol.

In some embodiments, a membrane formation process may include forming a membrane dope comprising a membrane forming solvent, a membrane forming polymer, a polyoxazoline, and optional additives. In some embodiments, the polyoxazoline may be polyethyloxazoline (PEOAz). The membrane forming polymer may be a hydrophobic polymer, for example, one or more of a polyolefin, PVDF, PES, PSf, PAN, ethylene-chlorotrifluoroethylene copolymer, ethylene-chlorotrifluoroethylene terpolymer with n-butyl acrylate, terpolymers of vinyl fluoride/chloride, vinylidene fluoride/chloride, hexafluoropropylene, chlorotrifluoroethlyene, and tetrafluoroethylene. In some embodiments, the membrane forming polymer, the polyoxazoline, and optional additives are separately dissolved in a membrane forming solvent (or solvents) and the dissolved solutions are then combined. In various embodiments, however, the dope can be formed in any manner known in the art for forming a mixed polymer dope.

In various embodiments, any suitable ratio of components can be utilized. In some embodiments, the polymeric blend or porous polymeric membrane has a ratio of membrane forming polymer to polyoxazoline of from about 2:1 wt/wt to about 50:1 wt/wt, from about 3:1 wt/wt to about 28:1 wt/wt, or from about 3:1 wt/wt to about 4:1 wt/wt. Outside of these ranges, membrane properties such as mechanical and flow properties and hydrophilicity may degrade.

In some embodiments, there is provided a membrane dope comprising a polymeric blend of a membrane forming polymer and polyoxazoline in an amount of from about 1 wt % to about 25 wt %, from about 10 wt % to about 25 wt %, or from about 14 wt % to about 20 wt %, and a membrane forming solvent in an amount of from about 60 wt % to about 80 wt %. The membrane dope may also further comprise one or more membrane additives in an amount of from about 1 wt % to about 15 wt %. Outside of these ranges, membrane properties such as mechanical and flow properties and hydrophilicity may degrade.

The one or more membrane additives may include pore forming agents, for example, polyvinylpyrrolidone (PVP) or polyvinylpyrrolidone-co-vinyl acetate (PVP-VA). The one or more membrane additives may include water.

Surprisingly, during preparation of membrane formulations including a hydrophobic polymer and polyoxazoline, no phase separation in the dope is observed. For example, no phase separation is observed in membrane formulations including PEOAz and PVDF, or PEOAz and other pore forming agents, for example, polyvinylpyrrolidone (PVP), or polyvinylpyrrolidone-co-vinyl acetate (PVP-VA) in NMP or in any other solvent in which the respective polymers are soluble. PEOAz is compatible with PVDF and blends of PVDF with various pore forming additives.

Porous fiber membranes may be prepared from membrane dopes including a hydrophobic polymer and polyoxazoline by a diffusion induced phase separation (DIPS) process, although thermally induced phase separation (TIPS) could also be used.

In the DIPS process a polymeric mixture is dissolved in a membrane forming solvent. The dissolved polymeric mixture is then contacted with a non-solvent for the polymeric mixture which is miscible with the solvent. Water, for example, is a suitable polymer non-solvent miscible with NMP. The solvent mixes with the non-solvent, and at the interface between the solvent and non-solvent, the polymer begins to separate. The precipitated polymer forms a porous structure containing a network of uniform pores.

In the TIPS procedure, a thermoplastic polymer or polymeric mixture is dissolved in a latent solvent which will dissolve the polymer at an elevated to temperature but will not do so at lower temperatures. The solution is cooled and, at a specific temperature which depends upon the rate of cooling, phase separation occurs and the polymer rich phase separates from the solvent. The polymer solution can be cast as a film or hollow fiber, and then immersed in precipitation bath such as water. This causes separation of the homogeneous polymer solution into a solid polymer and liquid solvent phase. Again, the precipitated polymer forms a porous structure containing a network of uniform pores.

In both TIPS and DIPS procedures, the production parameters that affect the membrane structure and properties include the polymer concentration, the precipitation media and temperature and the amount of solvent and non-solvent in the polymer solution.

EXAMPLES

Membrane Forming Dopes

To demonstrate how the addition of polyoxazoline may improve the mechanical and/or chemical properties of a membrane formed from a hydrophobic membrane forming polymer, a number of blends of polyoxazolines and hydrophobic membrane forming polymers were prepared and their properties analyzed. The details of the components used are shown in Table 1 in FIG. 1. The solvent used in these examples was NMP, as indicated in column 2. Column 3 shows the amount of membrane forming polymer used, which in these examples was PVDF (SOLEF® 1015 PVDF). Columns 4 and 5 show the amount of PEOAz and the relative amount of each molecular weight PEOAz. Columns 6 and 7 show the amount, if any, of further additive used (PVP-VA or glycerol). These additives may remain in the polymeric membrane after production (typically the case with PVP-VA) or be subsequently washed out (typically the case with glycerol).

Hollow Fiber Membranes

Figure 1:
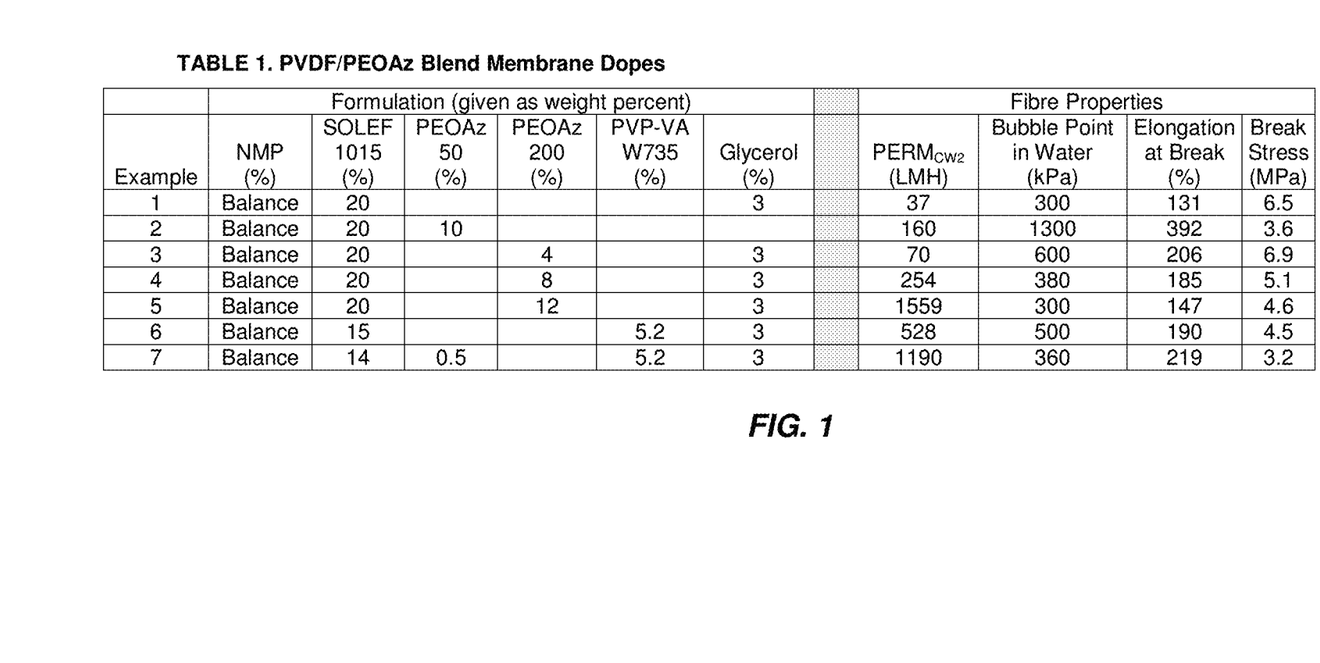
FIG. 1 is a table of the compositions and selected properties of various membranes formed in accordance with embodiments disclosed herein.

The membrane dopes 1 to 7 were cast into porous polymeric hollow fibers by conventional DIPS processes.

Fiber number 1 is a comparative fiber made from PVDF alone (along with glycerol as an additive). Fibers 2 to 5 contain PVDF and polyoxazoline. Fiber 6 is a comparative fiber prepared from a PVDF/PVP-VA blend, as is fiber 7, which further incorporates PEOAz.

The properties and performance of the fibers are shown on the right hand side of Table 1.

The examples in Table 1 illustrate the use of PEOAz in a polymer solution in an amount of from 0.5 wt % to 12 wt % (depending on molecular weight), but a useful range of polyoxazoline which may be added to a hydrophobic polymer to form a filtration membrane having desirable properties may be from about 0.05 wt % up to about 18 wt % of the total polymer solution composition. The amount of PEOAz used in a polymer solution may vary depending on the desired membrane properties, for example, flow properties, mechanical properties, pore size, hydrophilicity, and/or microstructure, and also depending on the hydrophilic polymer used. A desirable quantity of PEOAz added to a polymer solution may differ for different hydrophobic polymers and for hydrophobic polymers having different molecular weights. A skilled artisan would, upon becoming aware of the benefits of PEOAz as disclosed herein, be able to adjust the quantities of the membrane forming components required to achieve the appropriate balance between permeability, mechanical properties, and a desired membrane microstructure Table 1 shows that compared to the PVDF-only fiber (example 1), the PVDF-PEOAz fibers (examples 3 through 5) possessed highly desirable flow properties and elongation at break. In particular, whereas the clean water permeability and break at elongation were 37 LMH/bar and 131%, respectively, for the PVDF-only fiber, for the PVDF-PEOAz membranes, clean water permeability as high as 1559 LMH/bar and elongation at break as high as 392% were achieved. These values are extremely high for polymeric hollow fiber membranes, and are much higher than those seen for conventional PVDF membranes.

Examples 6 and 7 illustrate PVDF-PEOAz blend membranes prepared in conjunction with other polymeric pore forming agents. Example 6 is a PVDF membrane incorporating PVP-VA as a pore forming agent. Example 7 is a PVDF membrane incorporating PVP-VA as a pore forming agent and further incorporating to PEOAz. Examples 6 and 7 show that the bubble point of the membranes is improved as compared to a PVDF-only membrane by the addition of PEOAz, although at the cost of some mechanical strength. Examples 6 and 7 show that PEOAz improves the properties of not just single polymer membranes but also composite blend membranes made from two or more polymers (such as PVDF/PVP-VA membranes).

Figure 2:
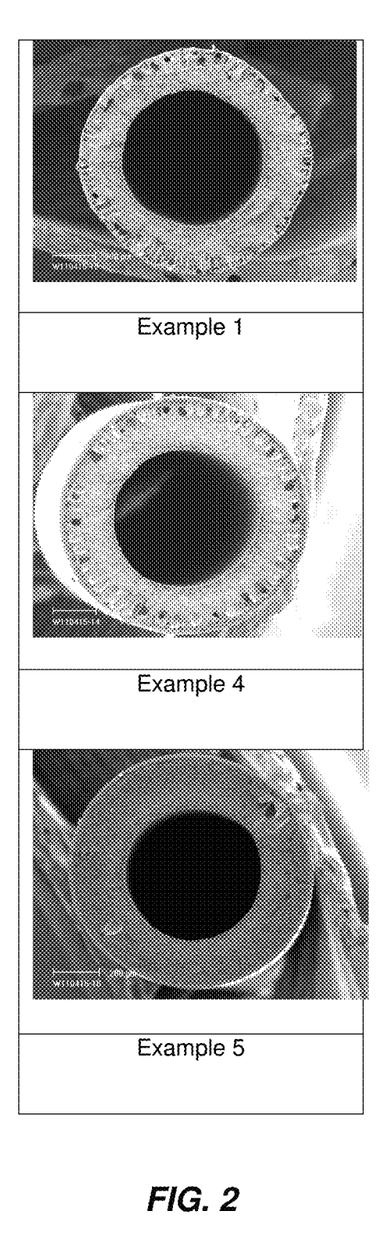
FIG. 2 is a group of SEM images of cross sections of embodiments of hollow fiber membranes in accordance with the present disclosure.

Examples of cross-sectional fiber microstructures, examined via SEM, are shown in FIG. 2. As can be seen the membrane of Example 5 exhibits a superior, more regular microstructure than those of Example 1 and Example 4. These SEM images indicate that PEOAz can be used to control the membrane microstructure.

PVDF/PEOAz membranes are more hydrophilic than PVDF membranes and as a result exhibit improved resistance to fouling.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A homogeneous hydrophilic composition formed from a mixture of:
   a membrane forming hydrophobic polymer comprising polyvinylidene fluoride (PVDF);
   polyvinylpyrrolidone-co-vinyl acetate (PVP-VA); and
   a polyoxazoline having the following formula:

the ratio of the membrane forming hydrophobic polymer to the polyoxazoline being from about 3:1 to about 28:1 by weight, wherein the alkyl group is one of a methyl, propyl, or butyl group.

2. The polymeric blend of claim 1, wherein the polyoxazoline has a molecular weight of from about 5,000 g/mol to about 500,000 g/mol.

3. The polymeric blend of claim 1, wherein the ratio of the membrane forming hydrophobic polymer to the polyoxazoline is from about 3:1 by weight to about 4:1 by weight.

4. The polymeric blend of claim 1, the homogeneous hydrophilic polymeric composition having an elongation at break of about 219%.

5. The polymeric blend of claim 1, the homogeneous hydrophilic polymeric composition having a break stress of about 3.2 MPa.

* * * * *